(No Model.)
S. H. JOHNSON & C. C. HUTCHINSON.
FILTER PRESS.
No. 459,488. Patented Sept. 15, 1891.
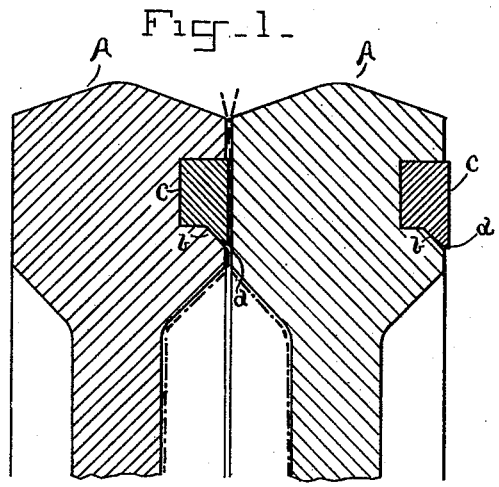
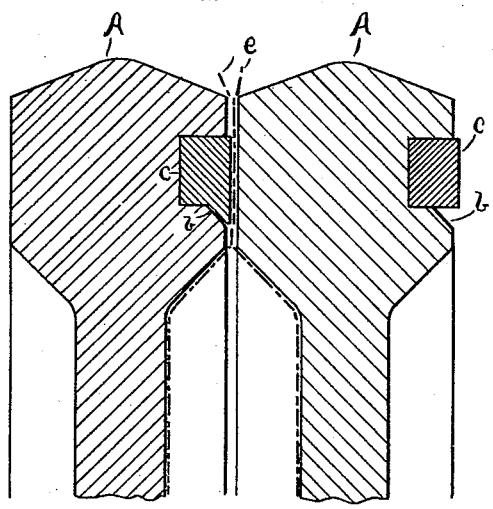
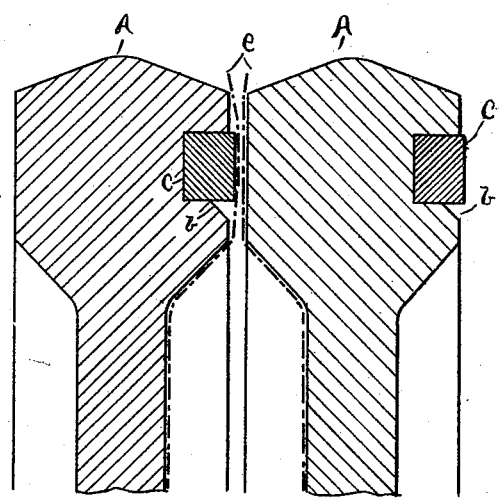
WITNESSES:
INVENTOR:

UNITED STATES PATENT OFFICE.

SAMUEL H. JOHNSON AND CHRISTOPHER C. HUTCHINSON, OF STRATFORD, ENGLAND.

FILTER-PRESS.

SPECIFICATION forming part of Letters Patent No. 459,488, dated September 15, 1891.

Application filed July 23, 1890. Serial No. 359,581. (No model.)

*To all whom it may concern:*

Be it known that we, SAMUEL HENRY JOHNSON and CHRISTOPHER CLARKE HUTCHINSON, subjects of the Queen of Great Britain, residing at Stratford, in the county of Essex and Kingdom of England, have invented certain new and useful Improvements in Filter-Presses; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our improvements have for their object the preservation of the filter-cloths used on such machines by preventing the undue wear of the same at the surfaces where they are nipped together round the margins of the filter-chambers, also facilitating the working of such machines with less powerful pressures than hitherto necessary for forcing the chambers together to make them liquid-tight. To accomplish this we form the rims of the filter plates or frames which form the chambers on one side where they meet together to form liquid-tight joints with grooves in them, the inside of which is flared or may be otherwise widened outwardly a portion of its depth, and in these grooves we insert elastic packings, such packings being molded on the internal side where the pressure is exerted with a projecting lip, which closes more tightly on the surface adjoining, according as the pressure is increased; or we construct the packing without the lip, but a little thicker, so that the internal side of such groove where the pressure is exerted shall leave the elastic packing only partially supported on the internal side in such a way that on tightening up the machine the spreading of the elastic material of the packings takes place only on the unsupported inner side, so forming a projecting lip on which the internal pressure is exerted, thus effecting a hydraulic joint.

In order that this our invention may be more clearly understood and determined, we describe the drawings as follows:

Figure 1 is a sectional view of the joint surfaces of parts of two adjoining filter-press plates, showing the flared grooves and the packing molded with the lip on the inner side. Fig. 2 is a similar view of such grooved plates and the packing made without the lip and showing the condition before the plates are closed up tight. Fig. 3 is a similar view of the plates and packing of Fig. 2 closed up tight and spreading out a lip of the inner edge of the packing on the flaring side.

A represents sections of portions of plates having the packing-grooves, with the outer portion of the inner side flared, as at $b$. $c$ represents the india-rubber packing-rings made to fit said grooves with the inward-projecting lip $d$ in Fig. 1, but without such lip in Figs. 2 and 3, and being as much thicker than the depth of the grooves as it is desired they shall be compressed when the plates are clamped together. When made without the lip, the rings should be a little thicker than is necessary when made with it. It will be seen that with either form of the packing-ring a lip will be pressed on the flaring side of the groove and form a hydraulic joint when the plates are clamped together, and thus pack liquid-tight with much less pressure than without such lip, besides being much less destructive to the filtering-cloths $e$.

The form and arrangement of the plates and mode of clamping them together in the press are so well known that further illustration in the drawings is unnecessary.

We are aware that india-rubber packings have been proposed for use in the joints of filter-presses, (*vide* English Patent No. 587, 1867;) but these require more pressure to make them liquid-tight, and consequently injure the cloths more than the hydraulic lipped packings, the subject of this invention.

We claim—

1. The combination, with the filter plates or frames having the packing-groove flared on the inside, of elastic packing-rings whereof a hydraulic packing-lip is projected on said flaring side when the plates are closed to oppose the internal pressure, substantially as described.

2. The combination, with the filter plates or frames having the packing-groove flared on the inside, of elastic packing-rings molded with a projecting lip on the corresponding side to oppose the internal pressure, substantially as described.

In testimony whereof we affix our signatures in presence of two witnesses.

SAMUEL H. JOHNSON.
CHRISTOPHER C. HUTCHINSON.

Witnesses:
G. F. WARREN,
   *Notary Public, London.*
WALTER J. SKERTEN,
   17 *Gracechurch St., London, E. C.*